United States Patent
Wittenburg et al.

(10) Patent No.: US 7,139,006 B2
(45) Date of Patent: Nov. 21, 2006

(54) SYSTEM AND METHOD FOR PRESENTING AND BROWSING IMAGES SERIALLY

(75) Inventors: Kent B. Wittenburg, Lynnfield, MA (US); Thomas R. Lanning, Littleton, MA (US); Clifton L. Forlines, Cambridge, MA (US); Alan W. Esenther, Ashland, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 186 days.

(21) Appl. No.: 10/357,562

(22) Filed: Feb. 4, 2003

(65) Prior Publication Data

US 2004/0150657 A1 Aug. 5, 2004

(51) Int. Cl.
  *G09G 5/00* (2006.01)
  *G06T 13/00* (2006.01)
(52) U.S. Cl. .................. 345/679; 345/959; 345/473
(58) Field of Classification Search ........ 345/473–475, 345/650–660, 672, 678, 680, 959, 679; 382/293
  See application file for complete search history.

(56) References Cited

U.S. PATENT DOCUMENTS

| | | | | |
|---|---|---|---|---|
| 4,965,558 | A * | 10/1990 | Saki et al. | 345/156 |
| 5,499,330 | A * | 3/1996 | Lucas et al. | 715/514 |
| 5,872,575 | A * | 2/1999 | Segal | 345/473 |
| 6,639,600 | B1 * | 10/2003 | Satake et al. | 345/473 |
| 6,771,268 | B1 * | 8/2004 | Crinon | 345/475 |

OTHER PUBLICATIONS

Tse et al., "Dynamic Key Frame Presentation Techniques for Augmenting Video Browsing," Proceedings of the Working Conference on Advanced Visual Interfaces (AVI '98), pp. 185-194, 1998.
Spence et al. "Rapid, Serial and Visual: A Presentation Technique with Potential," Information Visualization, 1, 1, pp. 13-19, 2002.
Wittenburg et al. "Browsing Through Rapid-Fire Imaging: Requirements and Industry Initiatives," Proceedings of Electronic Imaging '2000: Internet Imaging, pp. 48-56, 2000.
De Bruijn et al., "Patterns of Eye Gaze during Rapid Serial Visual Presentation," Proceedings of the Working Conference on Advanced Visual Interfaces (AVI 2002), pp. 209-217, 2002.

* cited by examiner

*Primary Examiner*—Kee M. Tung
*Assistant Examiner*—Michelle K. Lay
(74) *Attorney, Agent, or Firm*—Dirk Brinkman; Clifton O. Mueller; Gene V. Vinokur

(57) ABSTRACT

A method presents a set of input images on a display device. First, a set of display images is selected from the set of images. A 3D layout is assigned to each selected image, and a 3D trajectory is assigned to a virtual camera. A set of active images of the set of display images is rendered according to the layout and the trajectory. The set of active images includes a collector image. The collector images is rendered statically in a collector frame of an image plane of the display device, while remaining images in the set of active images are rendered dynamically on the image plane. Then, the layout and trajectory are animated according user input, and the rendering and animating is repeated until a termination condition is reached.

23 Claims, 14 Drawing Sheets

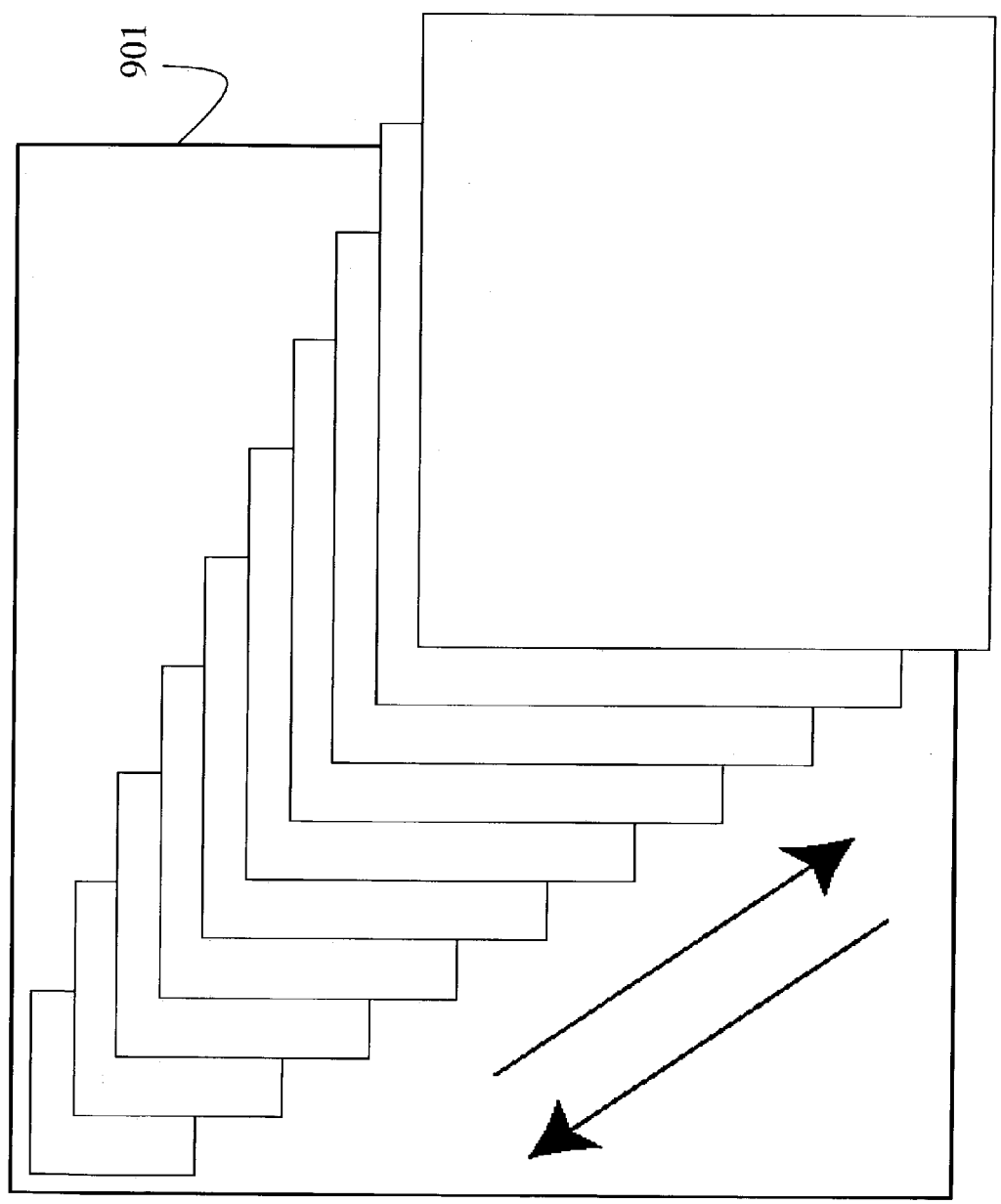

SYSTEM AND METHOD FOR PRESENTING AND BROWSING IMAGES SERIALLY

FIELD OF THE INVENTION

The invention relates generally to image presentation, and more particularly to image presentation for rapid scanning.

BACKGROUND OF THE INVENTION

In the physical world, we can get the overall gist of a book by rapidly riffling through its pages. This task is even easier when the book is illustrated. The same technique can be used to locate a known target within the book, i.e., a page that a reader has seen before and is now trying to locate again. Since getting the gist of an offering and searching for a know target are tasks commonly encountered in electronic information applications as well, there is a need for techniques in the digital world similar to those of riffling the pages of a book.

The standard practice in electronic media is to present information statically on "pages." Controls are provided to allow users to change to a different page, but not to flip rapidly forwards or backwards through a set of "pages."

The closest activities that resemble the riffling of book pages is fast-forwarding or rewinding through a video or "surfing" through channels of television signals. However, these controls do not allow users to control the speed and direction of the presentation to maximum advantage and the methods are not generally available as a method for overviewing or targeting information other than video.

For years psychologists have studied human visual perception through a type of presentation known as rapid serial visual presentation (RSVP). It is known that humans can process briefly presented images extremely quickly. There is a long history of experiments investigating cognitive processes involved in reading and visual perception where images or text are flashed quickly. A recent edited volume of papers provides a summary and historical overview of this work, see Coltheart (Ed.), "Fleeting Memories: Cognition of Brief Visual Stimuli," MIT Press, 1999.

It is believed that people process visual information in a series of brief discrete fixations of the eyes, typically in the range of 150 to 300 milliseconds. Between these fixations, saccade eye movements are rapid. Perception and comprehension of details are at the center of discrete fixations, whereas fuzzy perception at the periphery of vision is used in a process that determines the target of the next saccade.

In general, it is believed that visual perception progresses in stages that can lead to long-term retention in memory. However, it is possible for visual information to be seen and then quickly forgotten. Subsequent stages of cognitive processing leading to memory retention require resources that can interfere with visual perception and visa versa.

Of the prior art RSVP methods used in human-computer interfaces, the most basic uses a temporal sequence of single images that roughly corresponds to conditions studied in the psychology literature. Each successive image displaces a previously displayed image. That method of presentation has been referred to as slide-show or keyhole mode, see Tse et al., "Dynamic Key Frame Presentation Techniques for Augmenting Video Browsing," Proceedings of the Working Conference on Advanced Visual Interfaces (AVI '98), pp. 185–194, 1998, and Spence et al. "Rapid, Serial and Visual: A Presentation Technique with Potential," Information Visualization, 1, 1, pp. 13–19, 2002.

FIGS. 1–4 show other variations including carousel mode 100, see FIG. 1, dynamic collage mode 200, see FIG. 2, floating mode 300, see FIG. 3, and shelf mode 400, see FIG. 4. Those modes all use additional movement or displacement of the images.

To date there are only preliminary findings regarding the efficacy of RSVP methods in human-computer interfaces. It seems that the experiments thus far have simply confirmed that humans can extract visual information presented rapidly in slide-show mode. Tse et al. investigated fixed-rate slide-show methods for video browsing. Users were able to extract the gist of a movie, even when images were presented extremely rapidly, e.g., eight frames per second.

However, it has been hypothesized that the other RSVP methods might provide advantages by allowing the user more flexibility and control over their attention. The user could reject irrelevant images sooner, and focus longer on relevant images. However, preliminary experiments with more complex 2D spatial/temporal layouts, such as the carousel mode 100 and the dynamic collage mode 200 have not been able to show any advantage over slide-show mode. For example a pilot experiment comparing dynamic collage mode with slide-show mode is described in Wittenburg et al. "Browsing Through Rapid-Fire Imaging: Requirements and Industry Initiatives," Proceedings of Electronic Imaging '2000: Internet Imaging, pp. 48–56, 2000. They describe an experiment involving tasks in Internet shopping where users had full control over the speed and direction of presentation. They compared the slide-show RSVP mode with the dynamic collage mode, as well as with a more conventional web page presentation method. In the dynamic collage mode, the images are placed successively and semi-randomly around a center point 201 until the images are occluded by subsequent images or are cleared from the display. Unlike the carousel mode 100, no image movement or scale changes are involved. Images of products were shown in three modes, slide show, dynamic collage, and web page. Users were asked to perform two tasks. The first was a gist extraction task. The second task was to determine the presence or absence of a target product. The relevant findings were that users preferred the slide-show mode over the dynamic collage and the web page mode, although no performance differences were observed.

The prior art methods, other than slide-show mode, require too much cognitive processing by the user since the user must attend simultaneously to many rapidly changing images and/or shift gaze to images at new 2D locations. Some of these methods require tracking in 2D, e.g., the carousel mode 100, and others require shifting gaze to focus to different locations, e.g., the dynamic collage mode 200. It should not be surprising that variants in which images move or in which images pop up at new locations require additional cognitive overhead.

De Bruijn et al. describe eye-tracking experiments connected with RSVP interface methods, see De Bruijn et al., "Patterns of Eye Gaze during Rapid Serial Visual Presentation," Proceedings of the Working Conference on Advanced Visual Interfaces (AVI 2002), pp. 209–217, 2002. They compare a number of RSVP alternatives that require tracking, e.g., carousel, or focusing to different positions, e.g., dynamic collage. They make a number of observations regarding the patterns of eye gaze for the RSVP variant modes tested. They observed that different eye-tracking strategies were used for the shelf mode 400. One user seemed to focus only on the area in which new images appeared before moving off to background portions of the presentation. Another user seemed to track the images as they were moving. We hypothesize from these observations that new methods are needed to support users changing the focus of attention in order to adjust to their task (e.g., searching for a target image vs. extracting the gist of a sequence).

Therefore, it is desired to exploit human visual and cognitive capabilities to improve the presentation and browsing of electronic multimedia content.

SUMMARY OF THE INVENTION

The invention provides a system and method for interactively presenting images in a manner suitable for rapid scanning. The invention takes advantage of the natural human cognitive ability to track objects moving towards or away from the viewer in three-dimensional space.

The invention integrates a focus area that enables the processing of rapidly presented visual information without excessive eye movement. A refinement of the layout applies to images that are temporally related or grouped logically. A further innovation allows for relative temporal sequencing in order to progress through targeted images in the overall collection.

The invention can be applied to a large number of display systems where choices must be made from a collection of images that can be represented visually. Examples include browsing and searching of recorded videos, selection of television programs, people finding, and selecting items from catalogs in virtual or virtually augmented retail environments.

BRIEF DESCRIPTION OF THE DRAWINGS

FIG. 9 shows image control according to the invention;

DETAILED DESCRIPTION OF THE PREFERRED EMBODIMENT

Introduction

Our invention provides a method and system for presenting and browsing images that takes better advantage of the human visual system, specifically depth and peripheral perception. The method is integrated with the more familiar slide-show mode of rapid serial visual presentation (RSVP), and enhanced with a number of techniques for spatial and temporal layouts. We include a common set of controls for linear forward and backward traversal at adjustable rates of speed.

System Structure and Method

Figure 13:
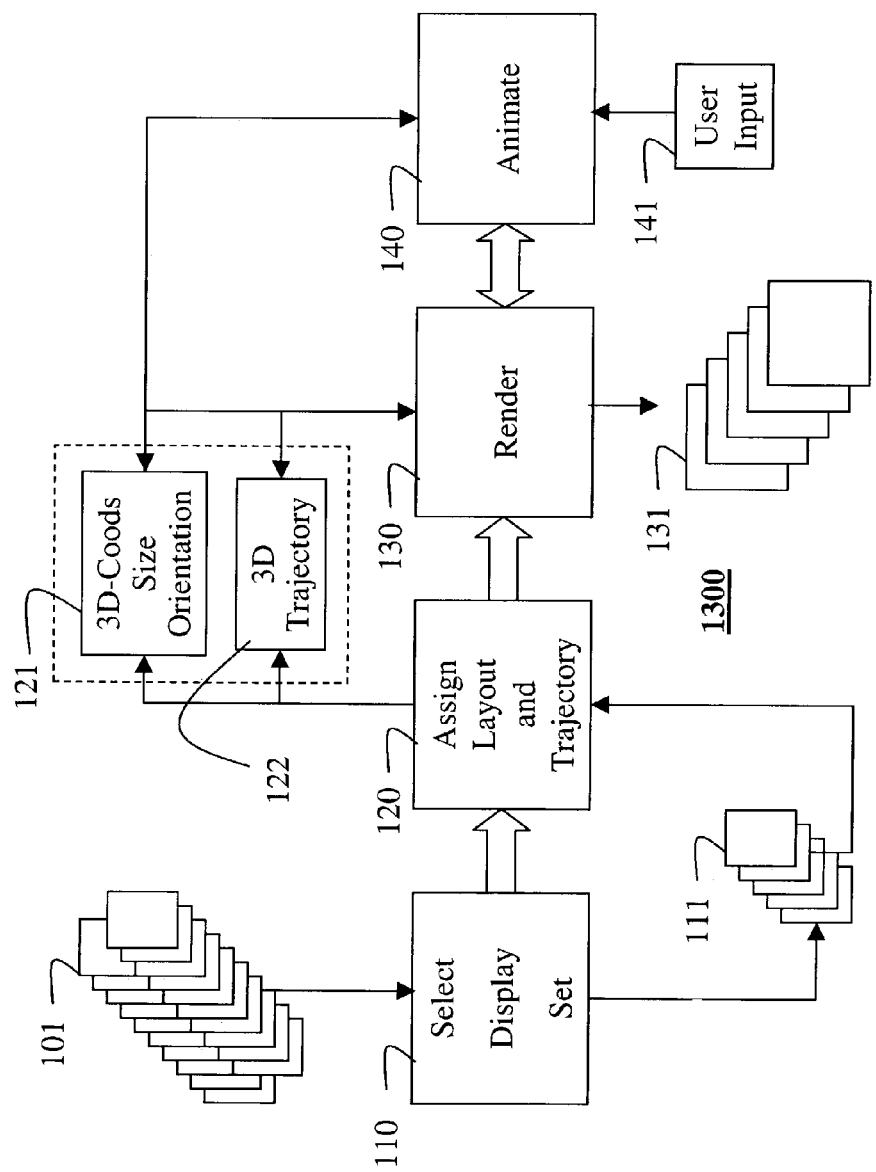
FIG. 13 is a flow diagram of a presentation method according to the invention.
Figure 14:
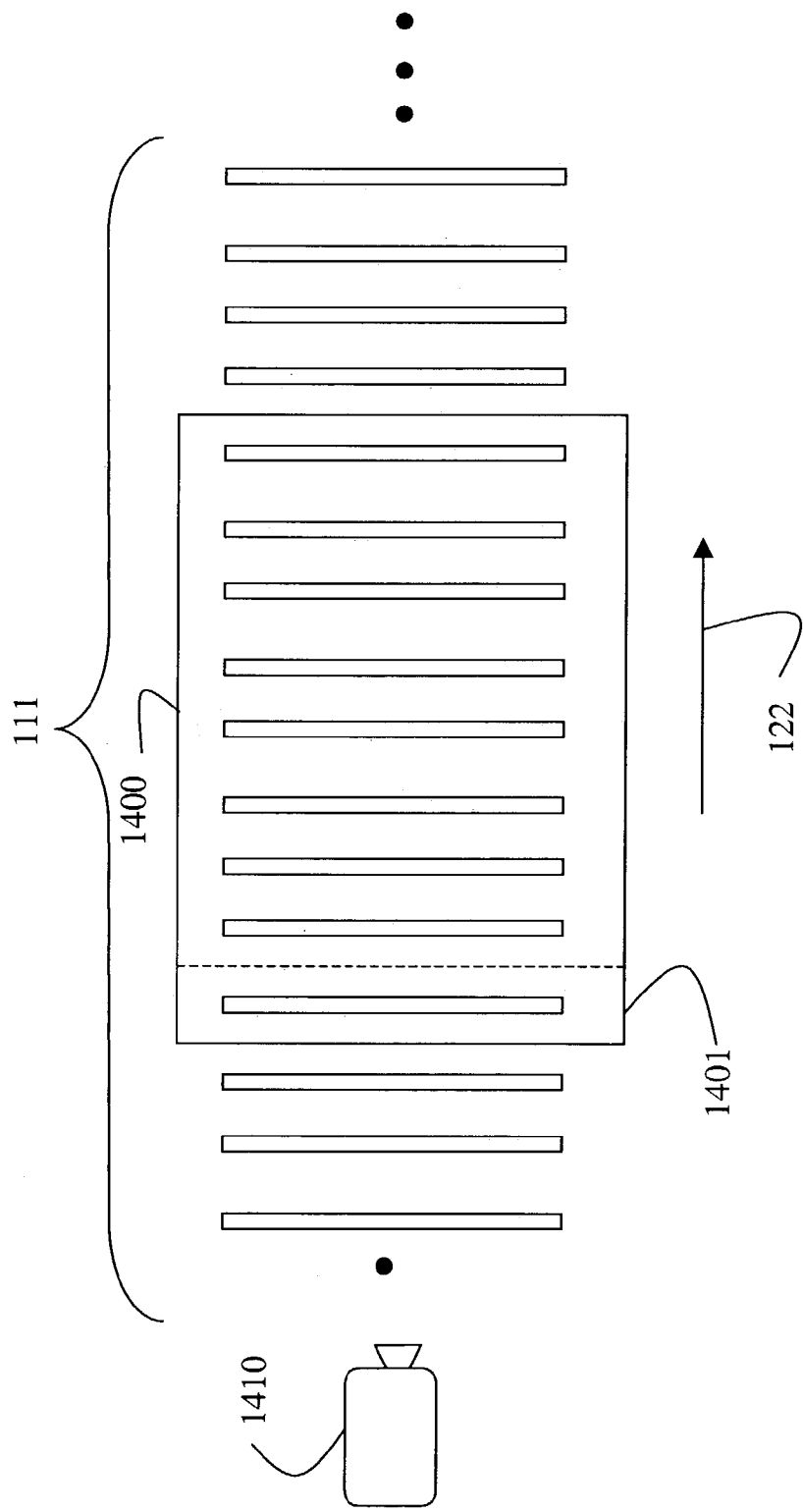
FIG. 14 is a block diagram of an active set of images according to the invention.

As shown in FIGS. 13 and 14, a method 1300 begins with a set of images 101. The set of images can be stored in a memory of a computer system. The images can be still images, pages of text documents; product pictures, or a sequence of images in a video. Step 110 selects a set of display images 111. The selection can be a summary, a periodic selection, e.g., every tenth frame, or some other selection process.

Step 120 assigns a layout 121 to the set of display images. For each image, the layout includes 3D coordinates, a size, and an orientation. Step 120 also assigns a 3D trajectory 122 to a virtual camera 1410. Step 130 renders an active set of images 1400 depending on the layout 121 and the trajectory 122. The active set 1400 includes a collector image 1401, and the remaining images are dynamic. The line 122 shows the trajectory of the camera 1410. The collector image is displayed statically in the collector frame, described below, while the rest of the images in the active set move towards the collector frame. The trajectory and active set essentially provide a moving window through the display set 111. As described below, the window can move in different directions, forwards or backwards, and at different rates.

The animation step 140 alters the layout and trajectory, perhaps using user input 141. The rendering 130 and animation 140 steps are then repeated until all display images are rendered, or the user terminates the method.

Selecting the Display Images

Given the set of images 101, e.g., the frames of a video, pictures of products or faces, pages of book, etc., the set of display images 111 is selected 110. This set can include any number of the original set's images up to and including the entire set. The process used to select the display set 111 can be any number of known techniques, including using key or I-frames of a video, a video summary, or periodic or random selection. The images in the display set can be a sequence of related or unrelated images.

Assigning the Layout to the Display Images

Figure 1:
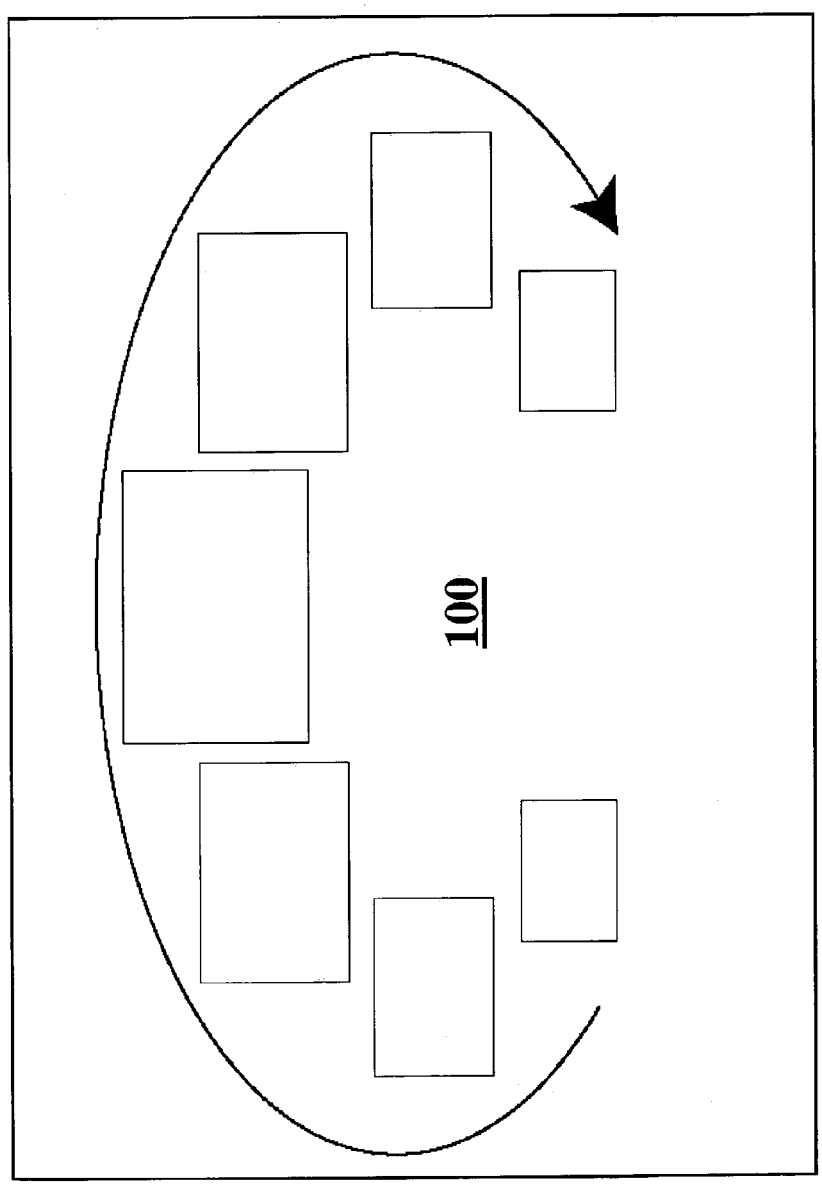
FIG. 1 shows images displayed according to prior art carousel display mode.
Figure 2:
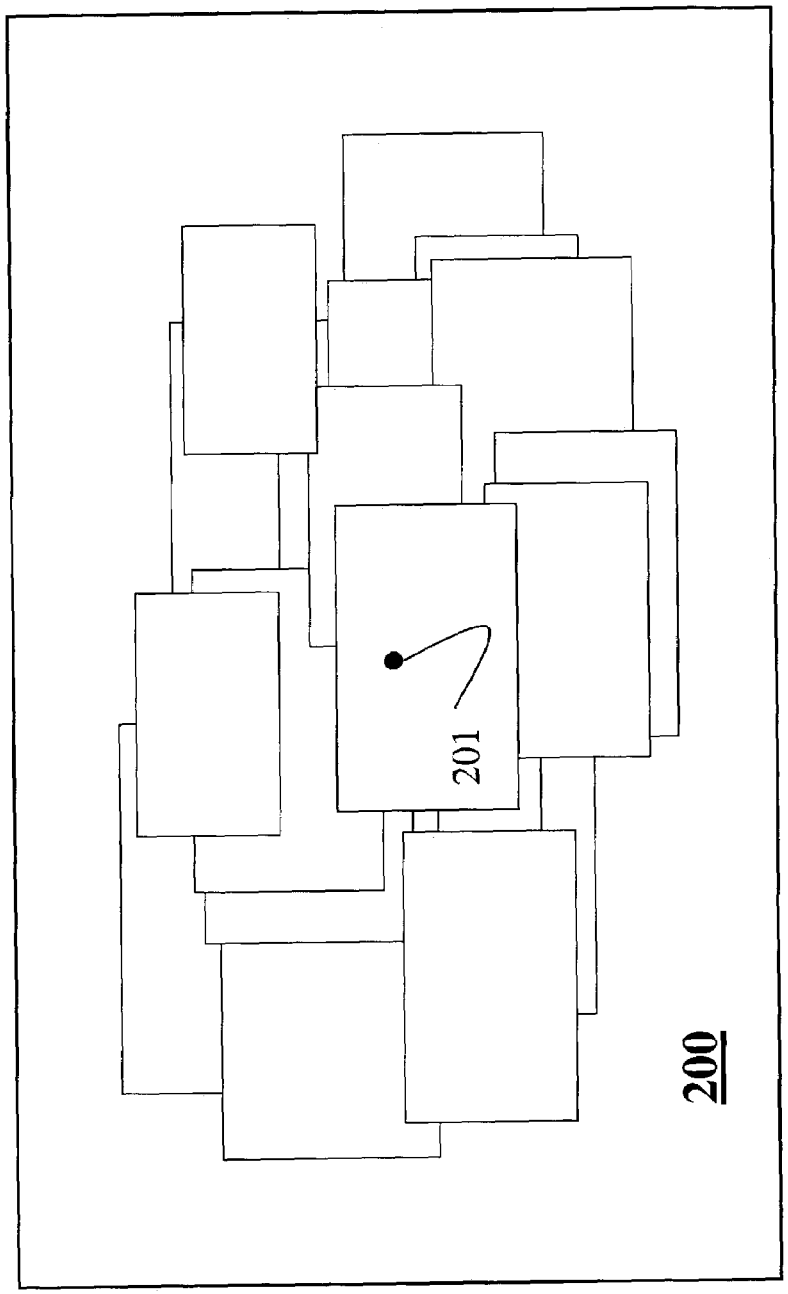
FIG. 2 shows images displayed according to prior art dynamic collage mode.
Figure 3:
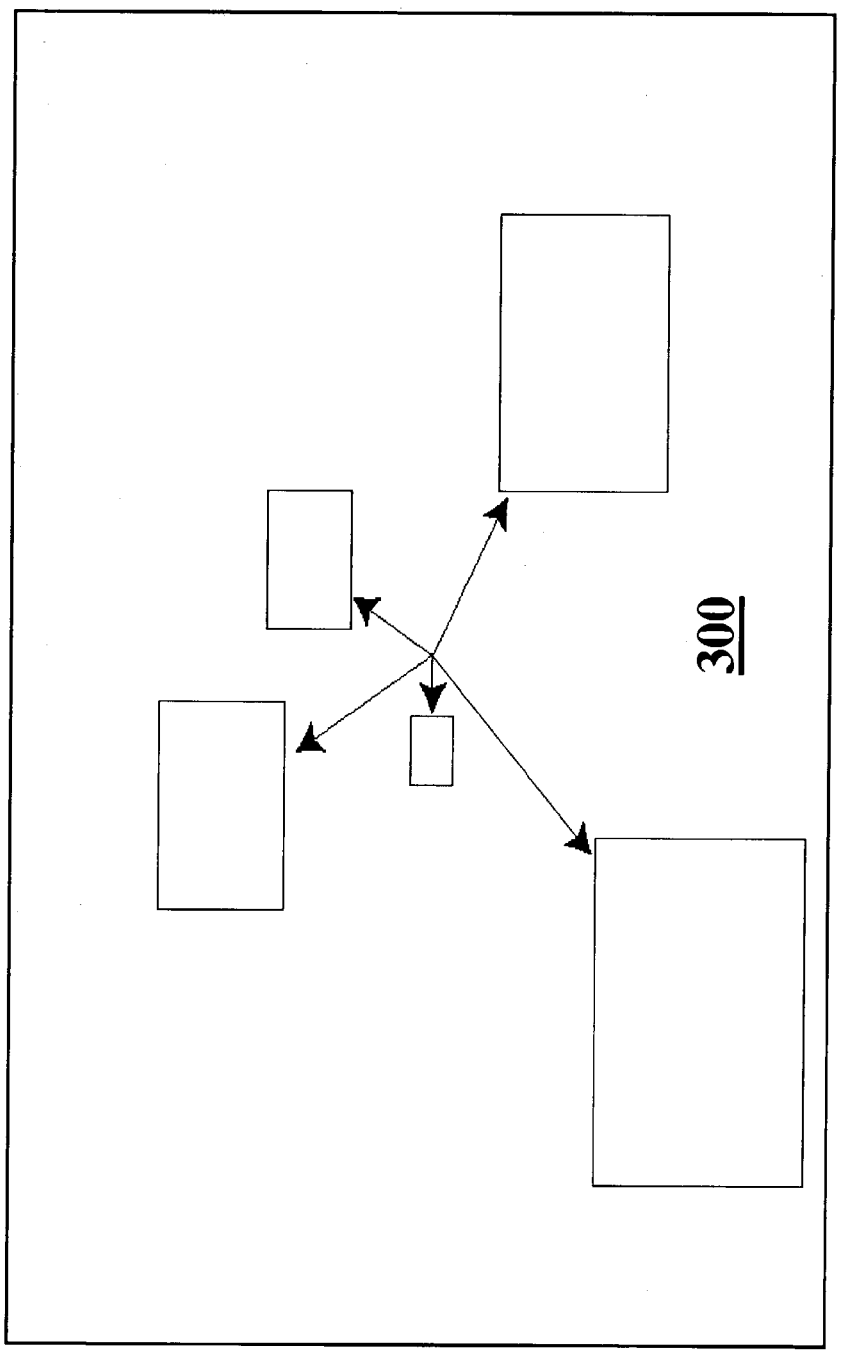
FIG. 3 shows images displayed according to prior art floating mode.
Figure 4:
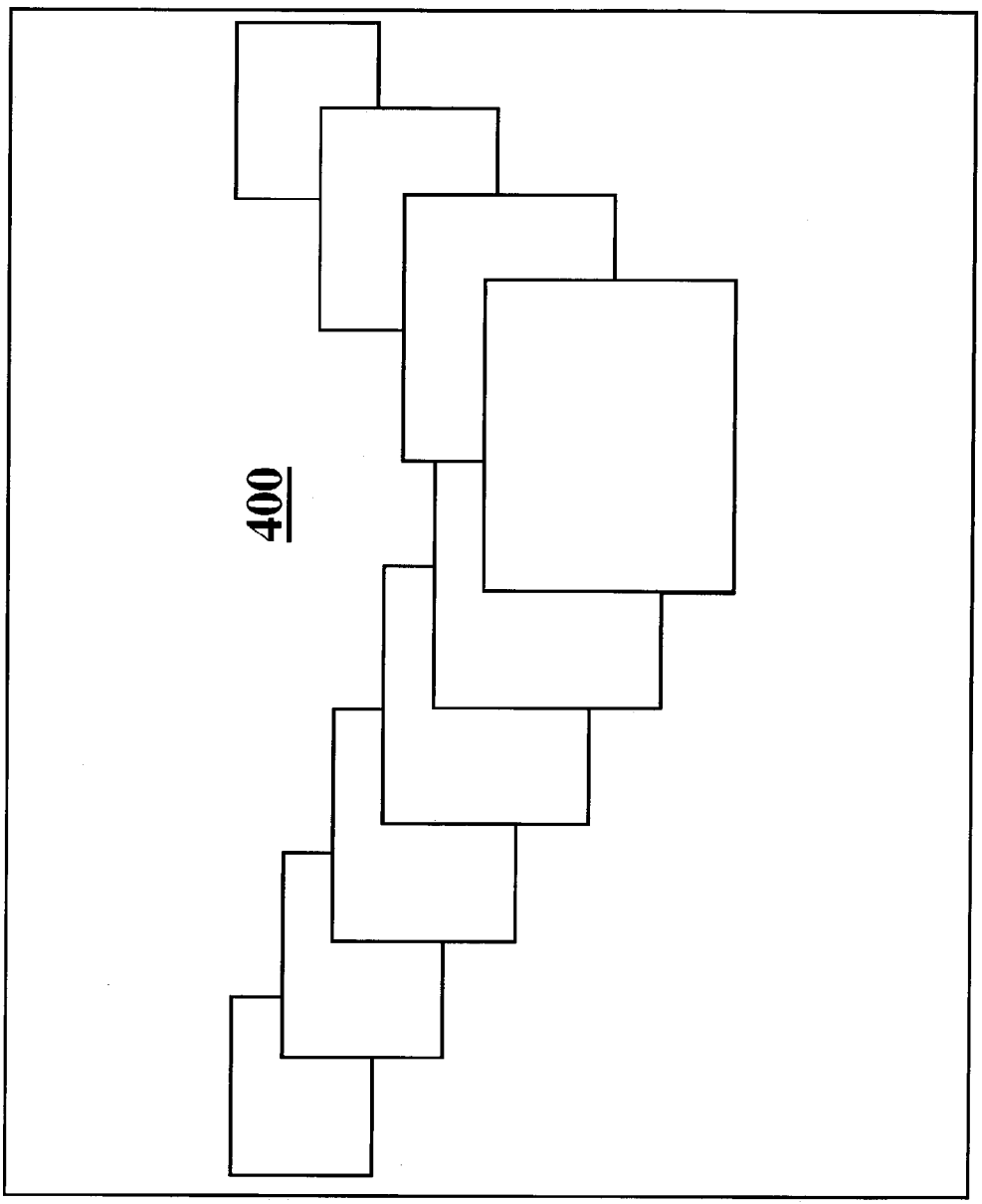
FIG. 4 shows images displayed according to prior art shelf mode.
Figure 5:
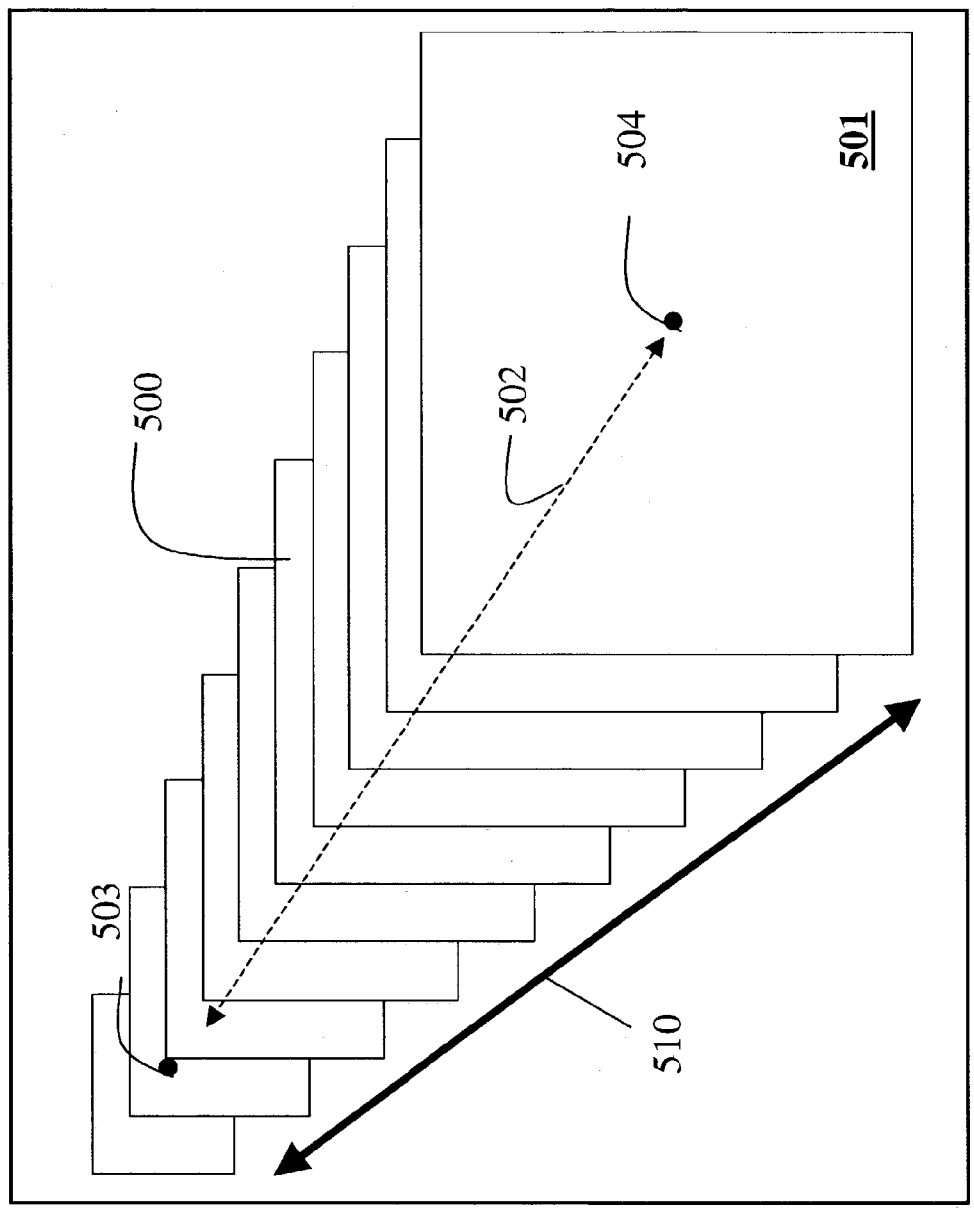
FIG. 5 shows images displayed along a linear three-dimensional trajectory according to the invention.
Figure 6:
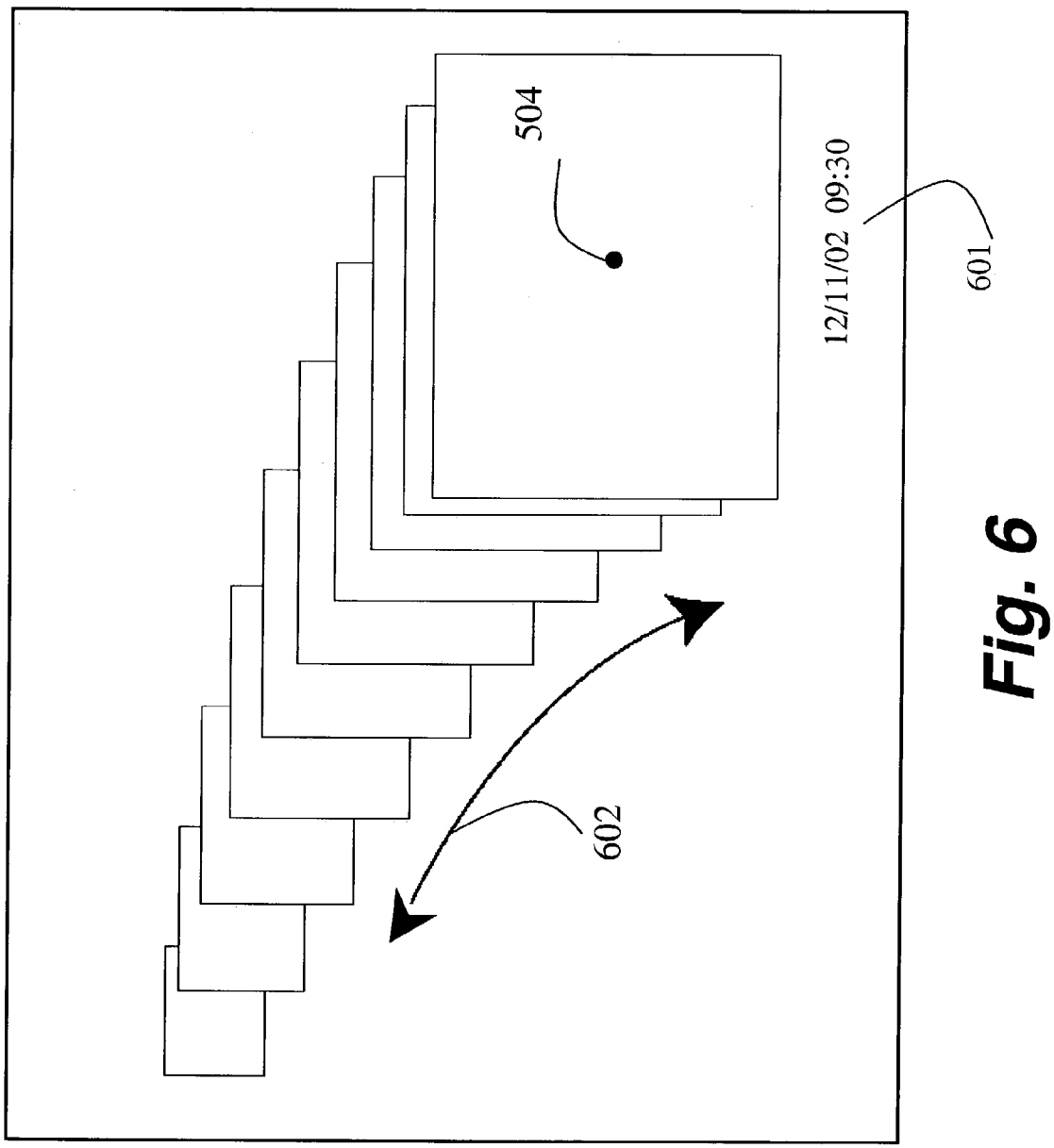
FIG. 6 shows images displayed along a curved three-dimensional trajectory according to the invention.
Figure 7:
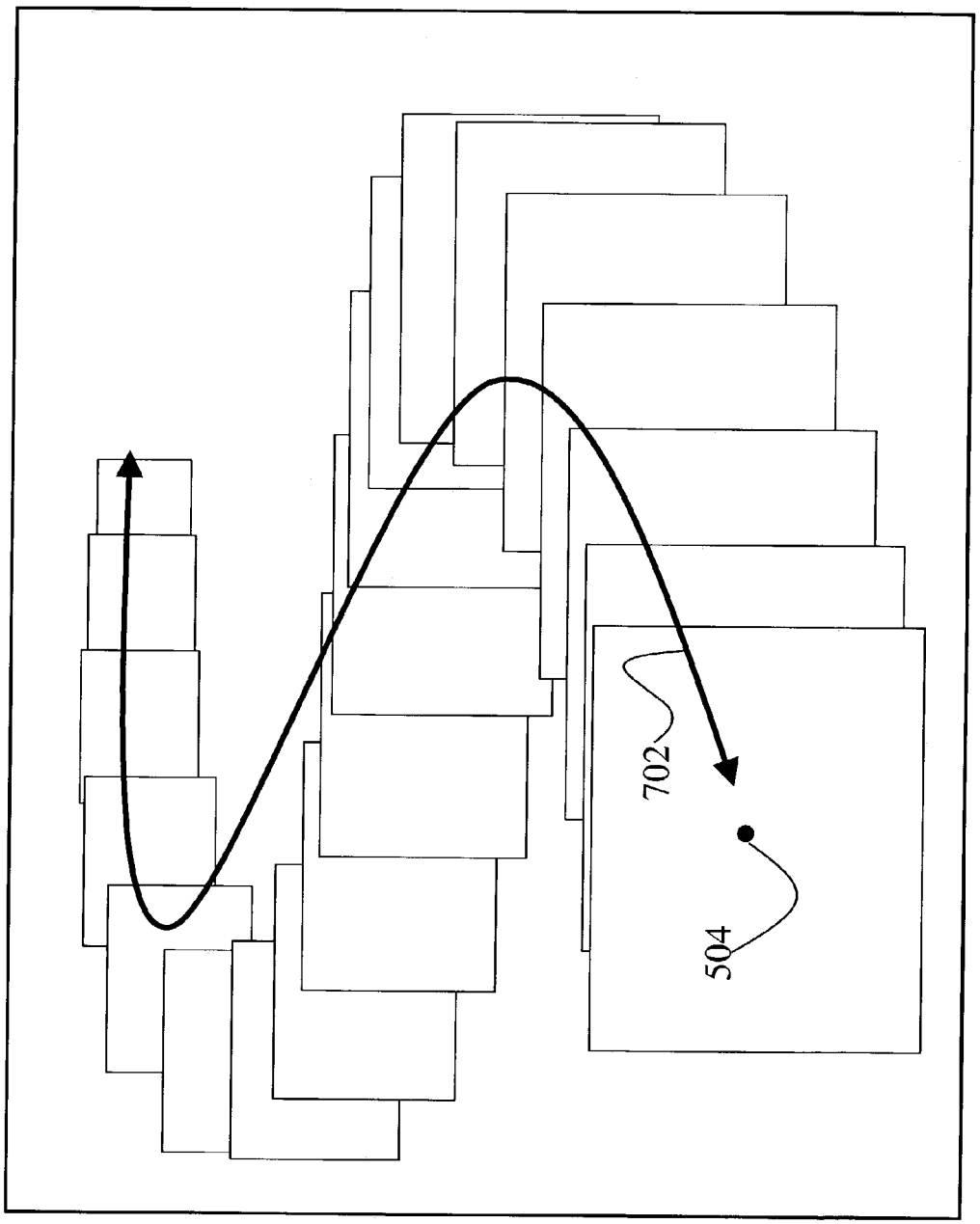
FIG. 7 shows images displayed along a seprentine three-dimensional trajectory according to the invention.

The method 1300 assigns 120 3D coordinate, size, and orientation to each image in the display set 111. The layout can be linear, circular, spiral, serpentine, or follow some other function. As shown in FIGS. 5–7, the layout of images 500 is arranged along a three-dimensional trajectory formed by a line from center point 503 to center point 504 in the display images.

Assigning the Trajectory to the Virtual Camera

The trajectory of the virtual camera 1410 can be linear 502, curved 602, or serpentine 702.

Rendering the Active Images

The "depth" of each image along the trajectory 122 is indicated by its size, with smaller images being farther away from the viewer. The nearest image is the one in the image plane of the display device or the viewing "screen."

Animating the Display Images

As shown in FIG. 9, the user controls the traversal of the camera 1410 along the trajectory 122. Traversal occurs in either direction at variable speeds. As the camera moves, the images appear to move closer, or further away, depending on the direction along the trajectory 122.

As shown in FIGS. 5–7, the visual effect of the animation is to advance 510 the sequence of images 500 towards or away from a focal point 501. The advancement is temporal with farther images, in a depth dimension, arriving at the focal point 501 later than nearer images, when moving forward through the sequence.

The presentation of images is analogous to the appearance of signs along a highway. In this analogy, the user can control both the speed and the direction (forward or backward) of a car. Looking out the windshield 901, the signs appear to move past at regular temporal and spatial intervals, appearing initially from far away and then moving closer. If the user is moving in reverse, the signs will appear in view from over the shoulder and then regress into the distance.

Collector Frame

In the basic mode of operation of our invention as described above, images appear to get closer and closer to the user, until they eventually move past the image plane and disappear. This is the standard metaphor of what would happen if a driver looking straight ahead in a car, as the car passes signs along the roadway.

We provide a variant on the basic display mode that has the advantage of maintaining continuity across related images, e.g., key frames within the same scene of a video. We also provide the static focal point 504 at the near end of the trajectory. Thus, the user does not have to shift gaze when displaying a rapidly changing sequence.

Figure 10C:
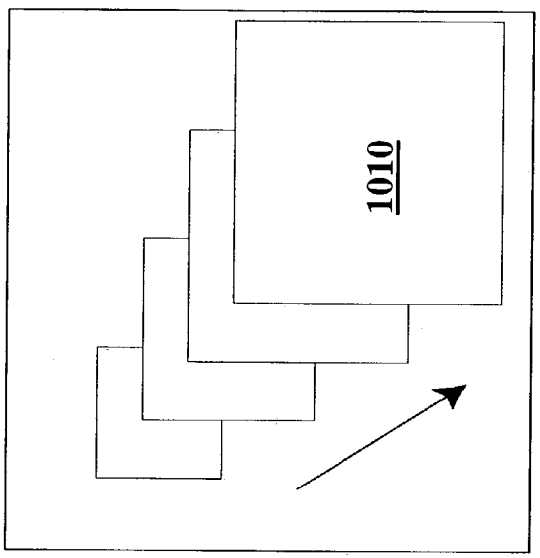
FIGS. 10A–C show a collector frame according to the invention.
Figure 10B:
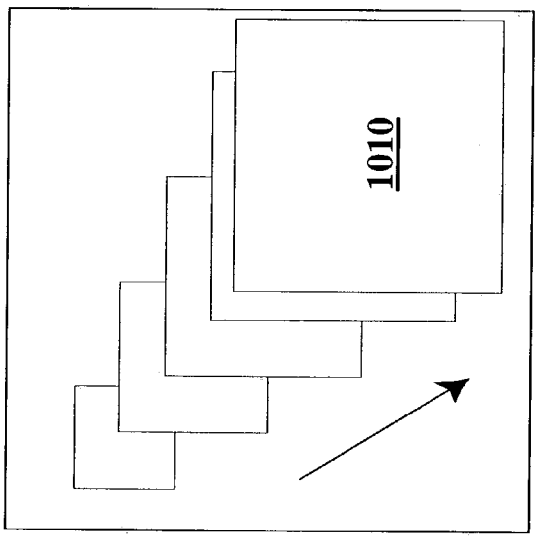
Figure 10A:
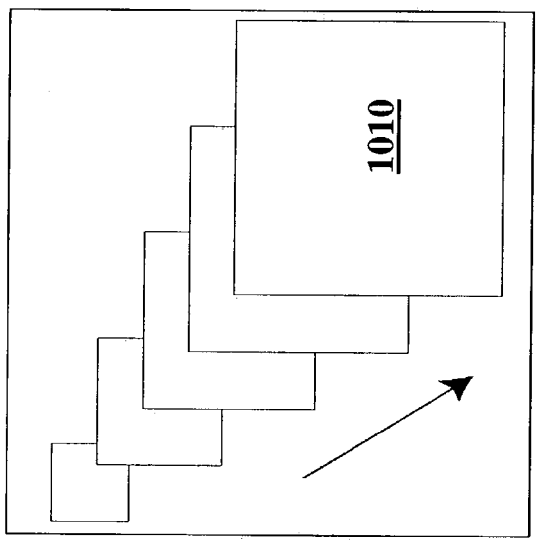

As shown in FIGS. 10A–C, we use a collector frame 1010 that is at a fixed depth position along the trajectory. As the visual images move closer, they eventually approach the position of the collector frame 1010, which is at the front of the view. After an image reaches the plane of the collector frame, instead of moving past the frame, it replaces the last image that was formerly displayed. In other words the first image 1401 in the active set is held statically in the collector frame, while the other images in the set appear to move towards the collector frame. The other images never conclude the image in the collector frame. From a visual standpoint, the collector frame acts as an area of visual focus whose contents is replaced at a rate much slower than the images advance in the sequence, e.g., the collector frame is replaced once a second.

The collector frame is analogous to the primary viewing area of a conventional video player. Thus, our method combines the advantages of fast forward and reverse of a conventional video players with a distance technique that allows the user to look ahead or behind the focal point in the sequence of images.

Our invention also takes advantage of the user's peripheral vision. While the user focuses on the collector frame 1010, the sequence of images advances from the rear in the user's peripheral vision. Thus, the user can anticipate peripheral high-level information, such as scene changes or the semantic groupings of image content, while still focusing at the foreground in the collector frame.

Semantic Spacing and Grouping

In the basic case, the images are spaced evenly as a single group along the 3D trajectory. However, the images can be unevenly spaced in multiple groups. Such spacing can represent the images semantically in a temporal sense, as logically ordered scenes or chapters, or as categories of products or services ordered according to cost. This all depends on the layout.

Transition Images

Figure 8:
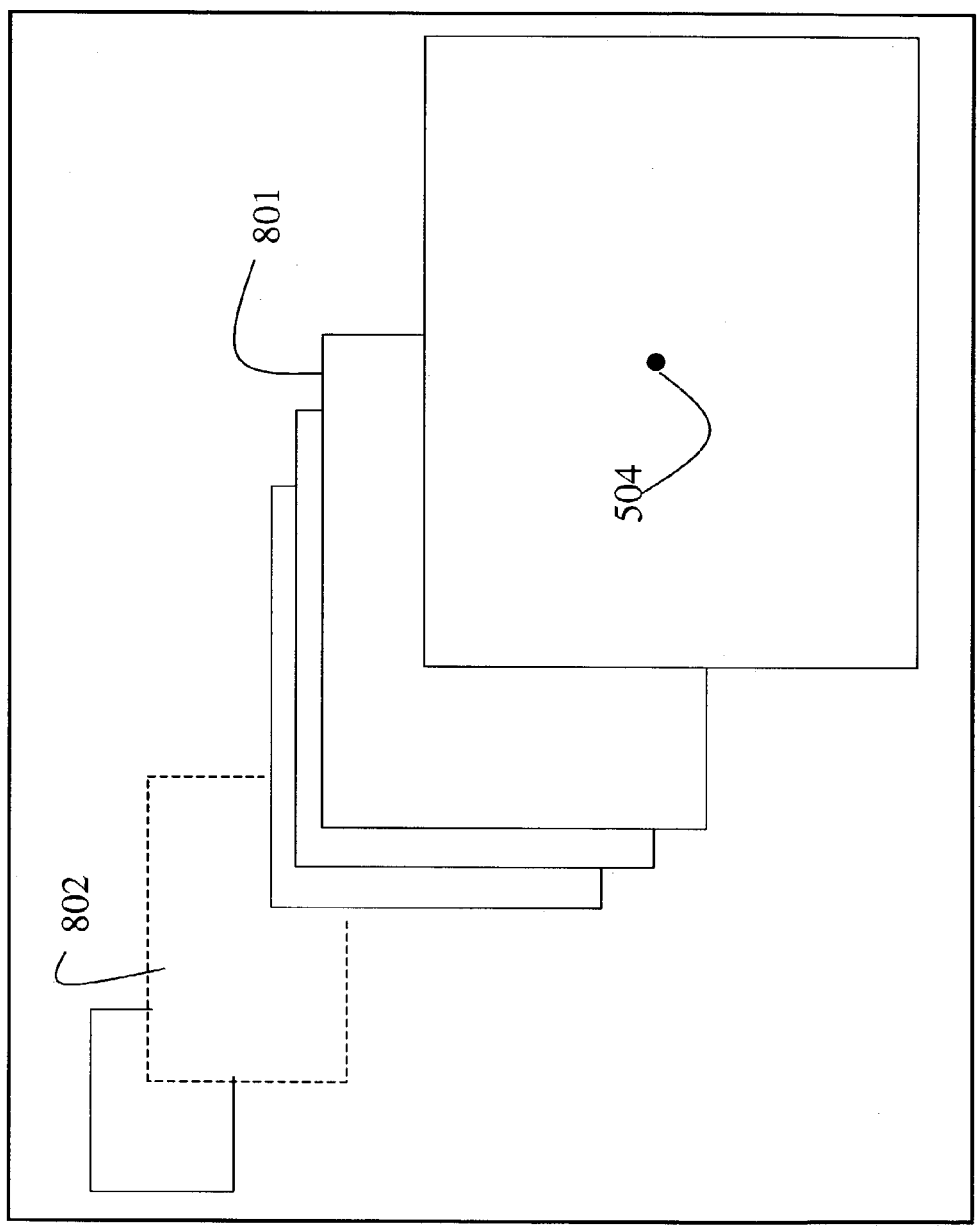
FIG. 8 shows groups of images separated by transition images.

To allow for semantic spacing and grouping as shown in FIG. 8, we insert a logical transition image 801 between groups in the sequence. The transition image can represent any form of visual transition from one group in the sequence to the next. The transition image can simply be vacant positions in the sequence, i.e., a transparent image 802.

The uses of groups and transition frames reflects any semantically coherent relationship among content in of the images that can be mapped onto some one-dimensional linear or nonlinear scale, for example, the content's objects' temporal placement.

Stopping Traversal of the Sequence of Images

From the psychology literature, it is known that cognitive resources are used for recognition and subsequent reaction to an initial low-level visual processing. This leads to a common problem of "overshooting" when using prior art RSVP modes. This is all too common when searching a video for a particular desired scene or image.

When the RSVP sequence is displayed at a rapid speed, the cognitive overhead required to process and respond to rapidly displayed images inevitably leads to the problem that later images will supersede a desired image. Then, the user may have to back up to retrieve the desired image, perhaps again, overshooting the desired image. Time is wasted while the image sequence oscillates.

Therefore, we provide novel techniques to stop rapid traversal of the sequence along the trajectory. Our method involves a formula for "backing up" after a stop event so that the probability of landing on the desired image is increased.

We determine the desired image based on an estimate of the time required to recognize an image, i.e., about 150 milliseconds, and an estimate of the time required to actuate the motor movement of a control action such as releasing a switch or moving a mouse off of a control icon, i.e., about 100 milliseconds. Therefore, when the stop event is signaled, the desired image is the image that was displayed at the focal point 504 about 250 milliseconds before the stop event was signaled. For example, at 30 frames per second, the eighth previous frame would be displayed.

Targeted Traversal

Figure 11:
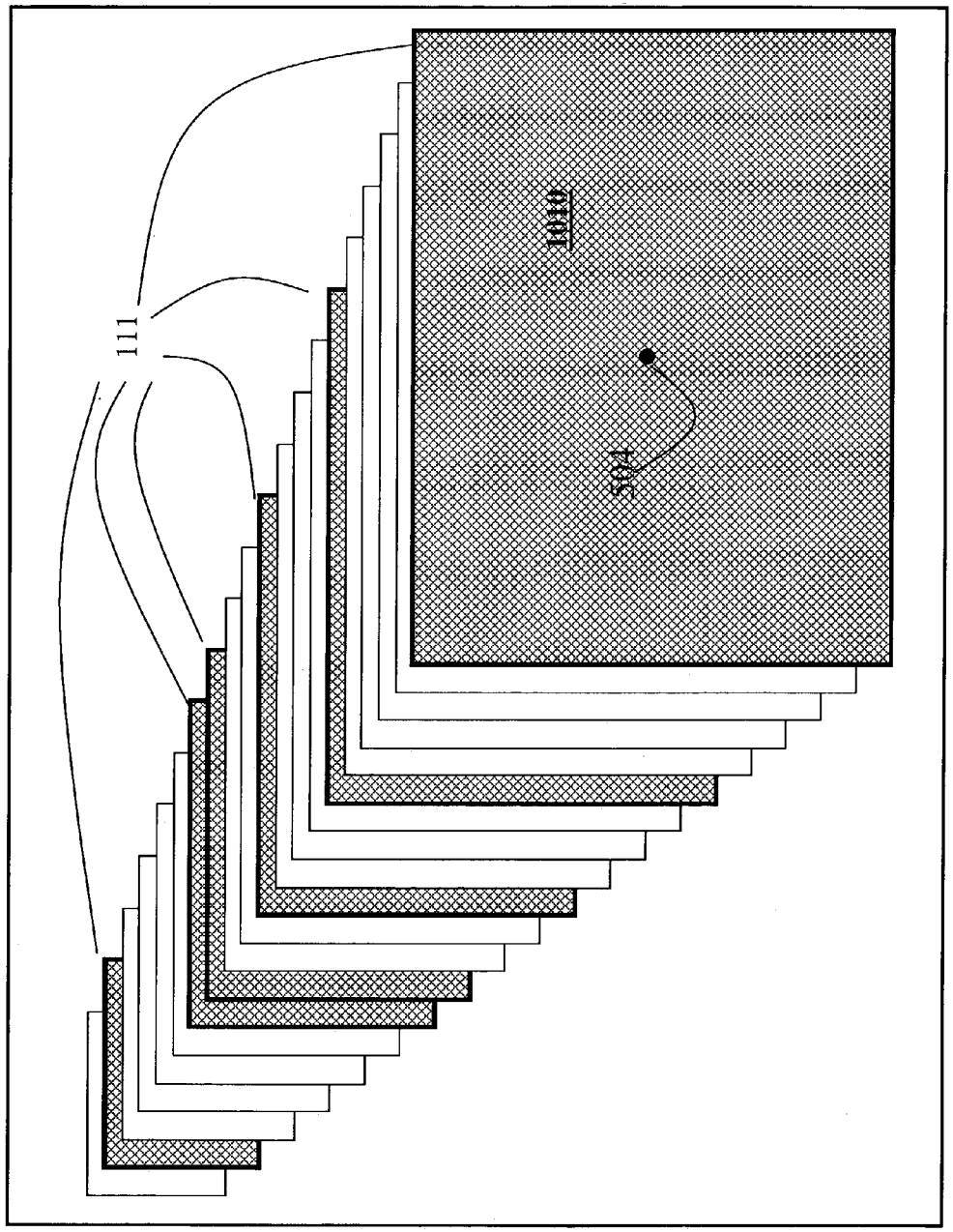
FIG. 11 shows semi-automatic presentation of images with target frames according to the invention.

As shown in FIG. 11, our invention also enables semi-automatic traversal of a sequence given a set of target frames 111. First, a query or menu operation is used to select 110 content from the entire set of available images 101 that is the sequence of images 111 that are to be displayed.

For example, if the images represent video content available on various television channels, then the user can select just sports channels. Alternatively, the images can be acquired of a scene by a surveillance system. Then, the user can select images for a specific time period, or a selected level of motion, or a recognized person.

Figure 12:
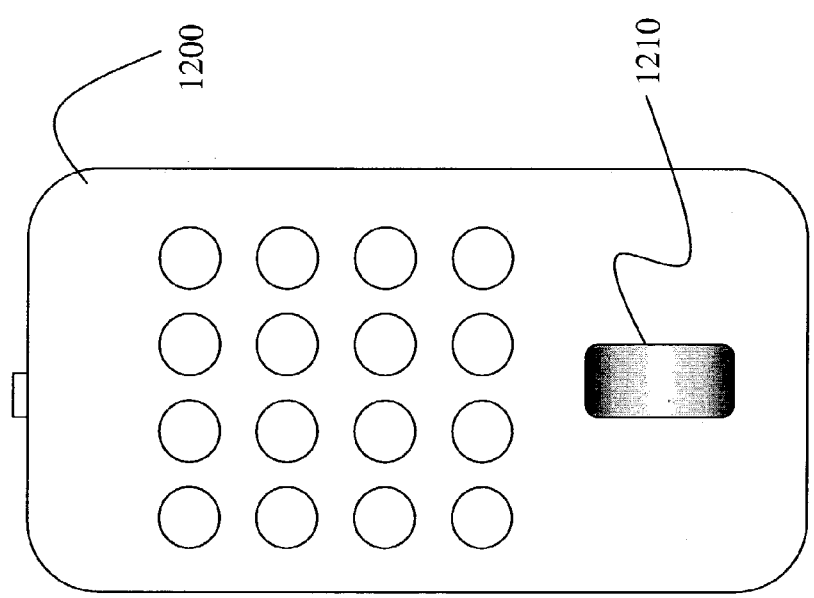
FIG. 12 is a block diagram of a user input device.

Having selected the set of target frames 111, the user manipulates the direction and speed controls in the described way, moving forward or backwards, faster or slower using the controller 1200 of FIG. 12. However, the rate of traversal also depends on distances from targeted frames so that transitions from one target frame to the next take a constant time. Here, the distances are measured according to the 3D coordinates. This has the perceived effect that the speed of passing images, as well as the frame rate in the collector frame 1010, varies according to how far away images are from the nearest target frame.

For example, traversal between far apart target frames take the same amount of time as traversal between closely spaced target frames. Also, the target frames remain longer in the collector frame than other images. During targeted traversal, the user controls the global frame rate at which the sequence is traversed. All other rates, from one targeted frame to the next, and the replacement rate of the collector frame, are relative to the user controlled global frame rate.

ALTERNATIVE EMBODIMENTS

The invention can be used in a variety of display applications wherever some sort of visual scanning or searching is required.

Channel Surfing

In this application, the channel images to be browsed are representative of television programs. A tuner (channel selector) that cycles through all received programs broadcasts can extract the channel images. One image is extracted from each program during one cycle through all the programs. Alternatively, the broadcaster can provide representative channel images.

As shown in FIG. 12, a control device 1200 has a switch 1210 for speed and direction control. In the preferred embodiment, the switch is a rocker switch. The Rocker switch allows for continuous control of speed over a certain range in forward and backward directions.

As the user presses the rocker, the current program is interrupted, and the system enters channel surfing mode. The user then traverses through the channel images, either forward or backward, at controllable rates of speed. When the user releases the rocker switch, the system displays the program corresponding to the channel image in the collector frame. This embodiment can be extended to time-shifted video programming. A query module is used to select a set of candidate program that make up a browsable sequence.

Video Skimming

In this embodiment, our method is used to browse, skim, or search videos. A video summarization method determines the key frames to be included in a browsable sequence. The summarization method can use well-known shot detection or scene analysis techniques. The position, in date/time 601, for each key frame in the sequence is indicated in the data associated with the key frames, and is displayed below the collector frame as shown in FIG. 6.

Product Browsing

In this embodiment, the images are of products. The user selects specific products to be browsed or skimmed. The product images can be grouped by price, size, color, manufacturer or other attributes.

People Finding

In this embodiment, the images are of people. The acquisition of such content can be done by directory services, government agencies, or surveillance videos. The sequence of face images could be ordered by time, location, or similarity.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for presenting a set of images, comprising: selecting a set of display images from the set of images; assigning a 3D layout to each image in the set of display images;

assigning a 3D trajectory to a virtual camera;

rendering a set of active images of the set of display images according to the layout and the trajectory, the set of active images including a collector image, the collector image being rendered statically in a collector frame of an image plane of a display device, while remaining images in the set of active images are rendered dynamically on the image plane, and in which the collector frame is at a fixed depth position along the trajectory;

animating the layout and the trajectory according to a user input; replacing the collector image in the collector frame with a next image in the set of active images; and repeating the rendering, animating, and replacing until a termination condition is reached.

2. The method of claim 1 wherein 3D coordinates, a size, and an orientation are assigned to each image in the set of display images.

3. The method of claim 1 wherein the trajectory is linear.

4. The method of claim 1 wherein the trajectory is curved.

5. The method of claim 1 wherein the set of images is a video, and the set of active images is a summary of the video.

6. The method of claim 1 wherein the selection is periodic.

7. The method of claim 1 further comprising:

traversing the virtual camera along the trajectory at a rate indicated by the user input.

8. The method of claim 7 wherein the traversal is reversible.

9. The method of claim 7 further comprising:

identifying target images in the set of display images; and traversing the virtual camera along the trajectory at a rate corresponding to distances between the target images.

10. The method of claim 9 wherein a time to traversing between any two target images is constant.

11. The method of claim 1 wherein the layout is linear.

12. The method of claim 1 wherein the layout is circular.

13. The method of claim 1 wherein the layout is spiral.

14. The method of claim 1 wherein a depth of an image, with respect to a viewer is indicated by the size of the image.

15. The method of claim 14 wherein the collector image is a first image in the set of active images and closest in depth.

16. The method of claim 1 further comprising: semantically grouping images in the layout.

17. The method of claim 1 further comprising: inserting logical transition images in the set of display images.

18. The method of claim 17 wherein the transition images are transparent.

19. The method of claim 1 further comprising: stopping the traversing according to an estimate of a time required to actuate the user input device.

20. The method of claim 1 further comprising: selecting the set of display images from multiple broadcast channels of television signals.

21. The method of claim 1 wherein multiple collector frames are used.

22. The method of claim 1 wherein video is used in place of static images.

23. A system for presenting a set of images, comprising:

a memory storing a set of images; a query engine configured to select a set of display images from the set of images;

means for assigning a 3D layout to each image in the set of display images;

means for assigning a 3D trajectory to a virtual camera;

a rendering engine configured to display a set of active images of the set of display images according to the layout and the trajectory, the set of active images including a collector image, the collector image being rendered statically in a collector frame of an image plane of a display device, while remaining images in the set of active images are rendered dynamically on the image plane;

means for animating the layout and the trajectory according user input;

means for replacing the collector image in the collector frame with a next image in the set of active images; and means for repeating the rendering, animating, and replacing until a termination condition is reached.

* * * * *